United States Patent [19]
Vo

[11] Patent Number: 5,956,402
[45] Date of Patent: Sep. 21, 1999

[54] PASSWORDLESS SECURE AND EFFICIENT REMOTE DATA UPDATE

[75] Inventor: Kiem-Phong Vo, Berkeley Heights, N.J.

[73] Assignee: AT&T Corp., New York, N.Y.

[21] Appl. No.: 08/812,641

[22] Filed: Mar. 7, 1997

[51] Int. Cl.$^6$ .................................................. H04L 9/00
[52] U.S. Cl. ................................. 380/21; 380/25; 380/44
[58] Field of Search .................................... 380/21, 25, 44

[56] References Cited

U.S. PATENT DOCUMENTS

| | | |
|---|---|---|
| 5,058,162 | 10/1991 | Santon et al. . |
| 5,153,919 | 10/1992 | Reeds, III et al. ........................ 380/44 |
| 5,204,902 | 4/1993 | Reeds, III et al. ........................ 380/44 |
| 5,455,863 | 10/1995 | Brown et al. .............................. 380/25 |
| 5,708,710 | 1/1998 | Dudd ......................................... 380/25 |
| 5,708,714 | 1/1998 | Lopez et al. .............................. 380/25 |
| 5,793,866 | 8/1998 | Brown et al. .............................. 380/21 |

FOREIGN PATENT DOCUMENTS

| | | |
|---|---|---|
| 0 717 353 A2 | 6/1996 | European Pat. Off. . |
| 2 681 165 A1 | 3/1993 | France . |

OTHER PUBLICATIONS

M. Rosenblit, "Secure Software Distribution", Proceedings of the Network Operations and Management Symposium, vol. 2, No. Symp. 4, 1994.

*Primary Examiner*—Salvatore Cangialosi

[57] ABSTRACT

Secure communication is effected when computers A and B that are interconnected by an insecure medium employ a dataset that is known to both and that is otherwise used within one or other of the computers for other than effecting secure communication as the shared secret from which an encryption key is derived. A dataset that needs to be securely communicated from computer A to computer B is encrypted with an encryption key derived from the shared secret. Computer B derives its own key and decrypts the received communication. In an enhanced version of this method, information is included in the transmission which assures computer B that no alterations occurred during transmission. When the dataset that needs to be securely communicated by computer A to computer B is an updated version of a dataset that already is present in computer B, a further enhancement suggests that computer A transmit only the difference between original dataset and the updated dataset. A benefit accrues when the dataset that is updated is also the dataset that is used as the shared secret, because the shared secret is changed with each update. In a still further modification, the shared secret is altered arbitrarily with each transmission in a manner that is unrelated to any specific function for which the shared secret dataset may be employed.

30 Claims, 3 Drawing Sheets

PASSWORDLESS SECURE AND EFFICIENT REMOTE DATA UPDATE

BACKGROUND OF THE INVENTION

Programs and data are increasingly replicated among computers that are geographically dispersed. When such computers belong to a single entity or cooperating entities, they are typically interconnected via a wide-area network. For example, large banks have many branches, and computers of those branches are connected to a computer in the central data processing center. Bank account balances are typically stored in bank branches as well as in a central data processing center. Similarly, computers that manage a telephone network often share the same routing tables and programs that compute optimal routing of calls. The common characteristic of such data or programs is that the same copy must be on all computers involved, that the contents must be protected from falling into the wrong hands, and that the rate of change may be high enough so that updating performance is important.

Current means for interconnecting computing elements to form a wide area network vary in their levels of security. Since some of these means are rather insecure, such as the Internet, the common wisdom is that means for insuring security need to be provided. The prevalent practice for exchanging data is to use encryption with some agreed-upon keys between the sender and the receiver. This practice has a number of drawbacks. If the key is only known to human users, then the data must be encrypted and decrypted by hand. This, of course, is extremely inconvenient, prone to errors, and is not very secure, particularly when many sites and people are involved. Alternatively, passwords can be stored in computers, so that encryption and decryption can be done automatically. This, however, involved password management procedures, with other security concerns. For example, computers are powerful enough to break short keys that are long-lived. Therefore, secret keys are typically altered at some regular intervals, and in accordance with a prescribed manner. However, once a key is broken, the interloper can also alter the key is the same prescribed manner.

In addition, the information required to update a dataset is typically much smaller than the new version itself. From this viewpoint, sending entire datasets to replace old versions is burdensome and expensive. In the context of this disclosure, the term "dataset" includes a string of data, a file, a related collection of files (such as the files that comprise a database) and even an unrelated collection of files.

Programs are also increasingly replicated among computers that are geographically dispersed but which do not belong to a single entity or cooperating entities. Those computers are typically not interconnected in a "hardwire" way, but many of these computers are accessible via modems. The most common example of that is programs that are sold by an entity, for example, Microsoft, to a large number of users. This segment of the industry has a need to provide updates of programs, but typically employs other than telecommunication means for providing the updates. Those that do permit the downloading of software are typically not interested in vouching for the integrity of the software and, therefore, do not employ any security measures.

Clearly, a method for secure and efficient remote update of data is desirable.

SUMMARY

A method is disclosed where computers A and B which are interconnected by an insecure medium can securely communicate information when both computers A and B possess a dataset, e.g. a file, that may be employed within one or the other computer for other than effecting secure communication and which is also used as the shared secret from which an encryption key is derived. A file that needs to be securely communicated from computer A to computer B is encrypted with a key derived from the shared secret. Computer B derives its own key from the shared secret and decrypts the received communication. In an enhancement of this method, a signature is appended which allows computer B to verify that no alterations occurred during transmission.

By modifying the shared secret, perhaps as often as with every transmission, the encrypted key is made more resistant to attack. Most advantageously, the modification to the shared secret is arbitrary, from the standpoint of the function of the dataset as a shared secret. For example, the shared secret may be a dataset that performs some other function in computer A or in computer B, and a modification to that dataset which occurs in consequence of the performance of that other function and which needs to be communicated from computer A to computer B effectively also modifies the shared secret.

In a further enhancement, when the dataset that needs to be securely communicated from computer A to computer B is actually an updated version of a dataset that already is present in computers A and B, computer A need transmit only the difference between the original file and the updated file.

DETAILED DESCRIPTION

The initial motivation for the method disclosed herein was the need, at times, to update a dataset in computer B to synchronize it with a dataset in computer A. As will be appreciated, however, the method applies well to any transmission between computers A and B when the two computers share a secret dataset. The shared secret dataset may be changed pursuant to some requirements that have nothing to do with the function of the dataset as a shared secret but rather follow the needs of some other functionality and, in fact, the primary reason for the existence of that dataset may be that other functionality.

To clearly demonstrate this, the following illustrative embodiment assumes that that shared secret dataset is also a dataset that is modified in computer A which needs to be correspondingly updated in computer B via a transmission from computer A to computer B. Hence, the following discussion assumes the expected condition. That is:

1) computers A and B are themselves secure but they are interconnected via a medium that is insecure, and
2) B somehow has a dataset V which is also known to A. An update is necessary when A is in possession of a dataset W which is an updated version of dataset V (or even new to A and B), and the task is to communicate dataset W from A to B in a secured manner. By "secured manner" one can means that an interloper who eavesdrops on the communication is unable to decrypt the transmission to thereby gain access to information dataset W. One can also mean that when B receives a transmission, B can determine with certainty that the received dataset is the same as the sent dataset. Both aspects are discussed below.

Figure 1:
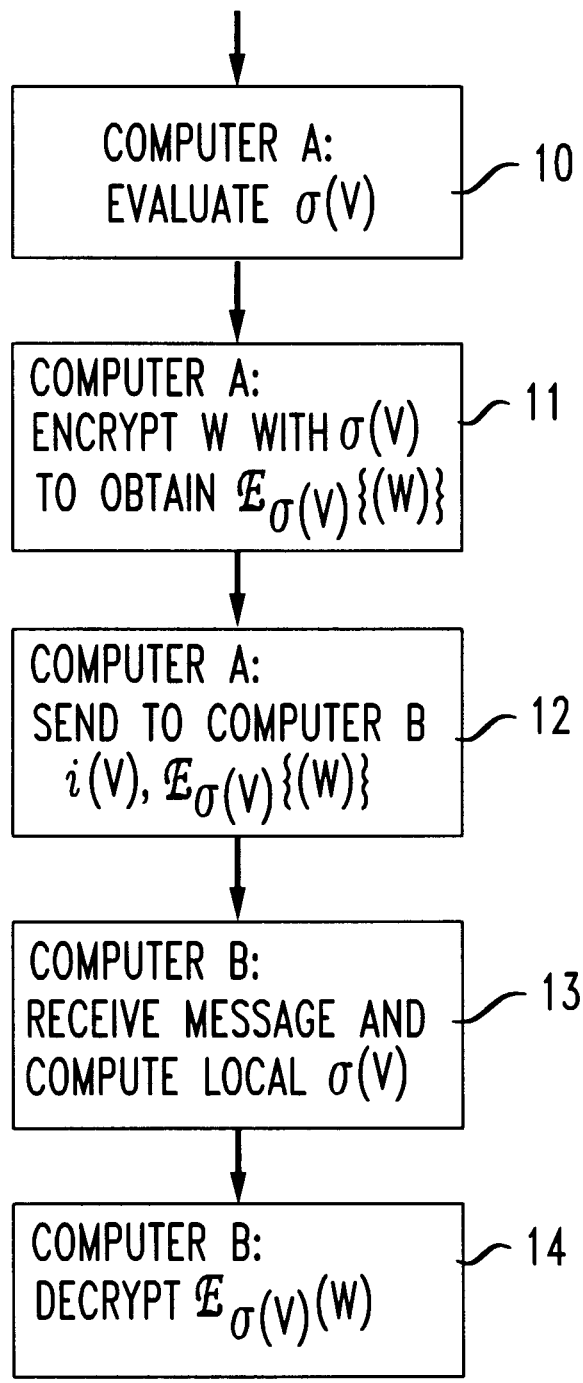
FIG. 1 presents one embodiment of the method disclosed herein.

As mentioned above, in accordance with one illustrative embodiment of the principles disclosed herein, the method depicted in FIG. 1 aims to communicate dataset W by using dataset V as the shared secret. It comprises the following steps, as depicted in FIG. 1.

(step 10): Computer A applies a one way function, such as a checksum function $\sigma$ to dataset V to obtain an encryption key $\sigma(V)$. Checksum functions are well known in cryptography (e.g., see R. L. Rivest, *The MD5 Message Digest Algorithm*, RFC 1321, 1992), and the specific function that is used (in this step and in other instances that are described below) is unimportant to the understanding or the practice of the method disclosed herein.

(step 11): Computer A encrypts dataset W which is the update to dataset V with key $\sigma(V)$ to obtain $E_{\sigma(V)}\{W\}$. Here, too, the specific encryption algorithm that is used (in this step and in other instances that are described below) is unimportant to the understanding or the practice of the method disclosed herein.

(step 12): Computer A sends the encrypted result of step 11 to computer B, together with i(V), the information that references the fact that dataset V is used as the shared secret, e.g., i(V), $E_{\sigma(V)}\{W\}$. This reference may be in plaintext as shown above, or it may also be encrypted.

(step 13): Computer B receives the message and the reference to V, and computes $\sigma(V)$ using the local copy of V to obtain its own encryption key.

(step 14): Computer B decrypts the message and thereby recovers dataset W.

It may be noted that whether W is an updated version of V is not reflected in the above-described method because it stops short of replacing V with W. Dataset W does not have to be an update of dataset V. If it is, then of course one would add that step. If W is brand new to computer B, then computer B merely installs W. The information regarding whether W is an update of V or not may be included in a header of W unless, of course, the method is used to only modify existing files, in which case the header might be omitted. It may be also noted that an advantage accrues to the security aspect of the transmission when W is an updated version of V, because with each update of the dataset the shared secret also changes, making the transmission very resistant to an eavesdropping attack. It may be further noted that in the above-described method use of the checksum function as an encryption key is somewhat arbitrary and is meant to accommodate encryption programs that use keys with upper bounded lengths. With a suitable encryption method, the entire content of V may be used as the encryption key.

Figure 2:
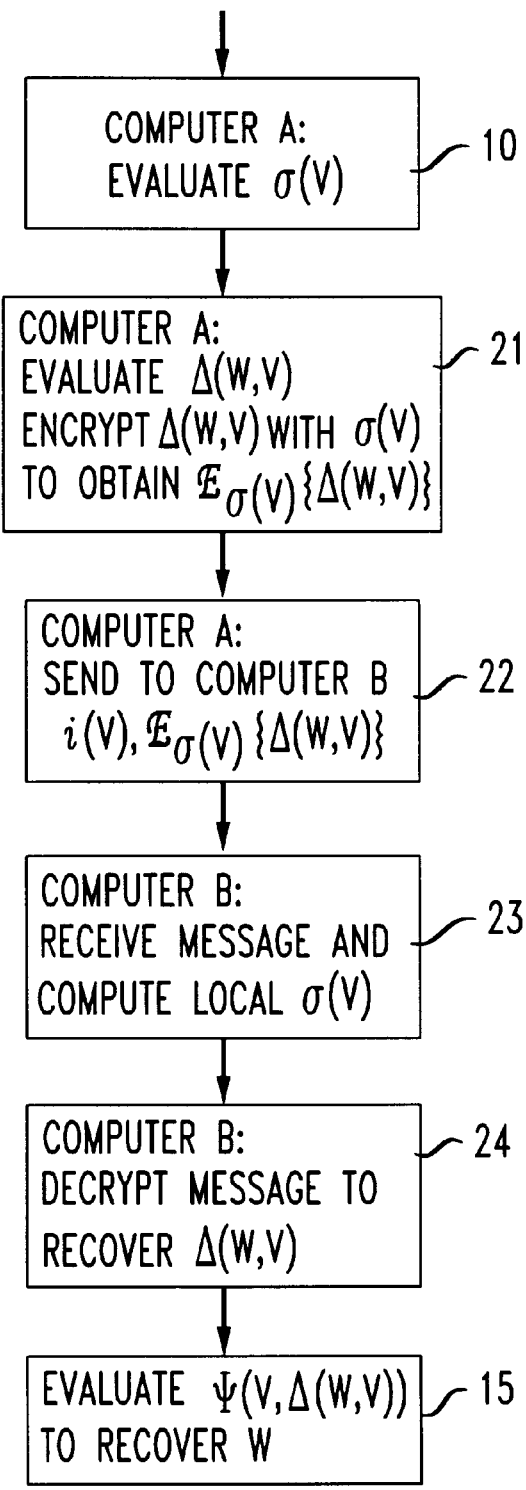
FIG. 2 presents a modified embodiment of the method disclosed herein.

Since dataset V may comprise a number of files, it should further be noted that the method of FIG. 1 works even when not all of the files are modified/updated in W. However, it is not necessarily advantageous to include in V and W files that never change, because the encrypted message becomes long; and the longer the message, the more opportunity it provides to an attack by an interloper. It is also not necessarily advantageous to include such files in the shared secret because that increases the burden of developing the encryption key, if one is used, or the burden of encryption if the shared secret is used as the key itself. Moreover, as indicated above, to speed things up and to reduce exposure to attack, it is advantageous to reduce the amount of data that is sent between computers A and B to an absolute minimum. FIG. 2 depicts an enhanced method which reduces the amount transmitted. Step 21 is an altered version of step 11 and it encrypts the dataset $\delta = \Delta(W,V)$ rather than W in FIG. 1, where $\Delta(W,V)$ is a function that computes the difference between datasets W and V in accordance with a given algorithm. Step 24 is an altered version of step 14, and in that step computer B recovers $\delta$. A step 15 is added wherein computer B applies its local dataset V and the recovered $\delta$ to function $\Psi(V,\delta)$ to obtain W. Function $\Psi$ is the inverse of the function $\Delta$. It may be noted that certain methods for computing differences also compress the resulting data to minimize $\delta$.

When V is a single file, $\Delta(W,V)$ can be obtained in the conventional manner described above. When V contains a plurality of sub-elements of the dataset, such as files $v_1, v_2, \ldots v_i, v_n$, and only one of the files is different between V and W, a more compact description of the difference between W and V may be to specify the file $v_i$ that embodies the difference between V and W and to then specify that difference. What is encrypted, then, is the difference between $v_i$ and its updated version $w_i$, together with the specification of the file that is being updated. That is, the key $\sigma(V)$ is applied to $[i,\Delta(w_i,v_i)]$ and what is sent is i(V), $E_{\sigma(V)}\{i, \Delta(w_i,v_i)\}$. In the case where a number of files are changed in V, the difference $\Delta(W,V)$ may be defined by $[i,\Delta(w_i,v_i); j,\Delta(w_j,v_j); \ldots ]$.

Computing $\sigma(V)$ obviously takes longer when V is large than when V is small. Hence, when V comprises a number of files, an additional enhancement is realized by defining the shared secret to be only that portion of V that has been last (or recently) updated. With such an approach, whichever file was last updated becomes the shared secret that is used in the next updating communication. In a case where a number of files $v_i,v_j$, have been modified, one can select a predetermined one of them, perhaps the first one, as the shared secret from which the encryption key is obtained. Of course, selecting any of the modified files comports with the spirit of this disclosure, as well as selecting a file that has been modified at a specified previous update (perhaps the penultimate update). Hence in a more generalized embodiment, the transmission from computer A to compute B includes an indication of the dataset V, of the dataset that is used as a shared secret, and the encrypted information, which includes an indication of the sub-elements of dataset V that are being modified/updated; that is, the transmitted information may be, i(U'), $V,E_{\sigma(V)}\{[i,\Delta(w_i,v_i); j,\Delta(w_j,v_j); \ldots ]\}$ or i(U'),$E_{\sigma(V)}\{V,[i,\Delta(w_i,v_i); j,\Delta(w_j,v_j); \ldots ]\}$, where U' designates the last update to dataset U; i.e., $\Delta(U,U_{previous})$. One advantage of the disclosed method is that every transmission from computer A to computer B may employ a different shared secret dataset. Typically, if the dataset that is transmitted by computer A is a modification of an existing dataset, then the shared secret is related to the dataset that is transmitted. If the dataset that is transmitted by computer A is new to computer B, then the shared secret may be the previously used secret. From the above it should also be clear, of course, the shared secret may be completely of the dataset that is being communicated by computer A.

Figure 3:
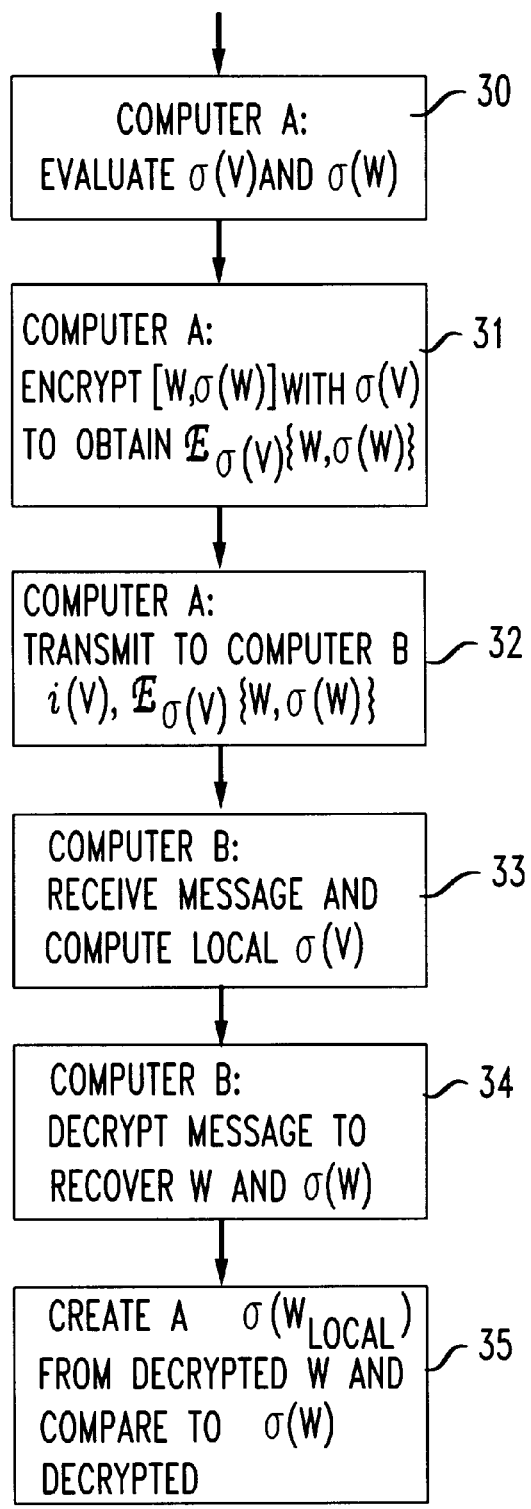
FIG. 3 presents a further modified embodiment of the method disclosed herein.

The above solves the issue of an interloper obtaining access to dataset W. It does not solve the problem of changes that may occur to the information while it transmits from computer A to computer B. These changes may be due to poor transmission and a failure in the higher level protocols, or it may be purposefully tampered with by an interloper. Such tampering with data can be detected by computer B by following the method described in FIG. 3. Specifically, (step 30): Computer A applied a checksum function $\sigma$ to datasets V and W to obtain encryption keys $\sigma(V)$ and $\sigma(W)$.

(step 31): Computer A concatenates σ(W) with W, encrypts the [W,σ(W)] result with σ(V) to obtain $E_{\sigma(V)}\{W,\sigma(W)\}$.

(step 32): Computer A sends the encrypted information to computer B, together with information that references the fact that dataset V is the shared secret.

(step 33): Computer B receives the message and the reference to V, and computes σ(V) using the local copy of V to obtain its own encryption key.

(step 34): Computer B decrypts the message and thereby recovers dataset W and the key σ(W).

(step 35): Computer B develops its own key σ($W_{local}$) based on the recovered dataset W, and compares that key with the one received. If the two are identical, computer B knows that the message received is the message sent.

As in connection with the FIG. 1 embodiment, the encrypted dataset is not limited to [W,σ(W)]. For example, it can also be [Δ(W,V),σ(W)], [W,σ(Δ(W,V))], or [Δ(W,V),σ(Δ(W,V))]. Also, the various variations that are disclosed above in connection with the method of FIG. 1 are also applicable to the method of FIG. 2.

One advantage of the disclosed method is that every transmission from computer A to computer B may employ a different shared secret dataset. Typically, if the dataset that is transmitted by computer A is a modification of an existing dataset, then the shared secret is related to the dataset that is transmitted. If the dataset that is transmitted by computer A is new to computer B, then the shared secret may be the previously used secret. And, of course, the shared secret may be completely independent and be explicitly specified by computer A.

The above-described methods do not address themselves to the issue of how computer B knows that an encrypted file has arrived. The simplest way to resolve this issue is to have a program which tends to run on computer B be charged with the responsibility to determine that an encrypted file has arrived and to then trigger the appropriate decryption method. It may be, for example, embedded in a mail program M. In accordance with such an approach, when M is executed, it determines whether a message arrived from computer A. If it has, it identifies the dataset that serves as the shared secret, creates a decryption key from the dataset, and decrypts the encrypted portion of the message. An alternative approach charges a program P that might at some point run on computer B to be responsible for executing the decryption task whenever it is used as the shared secret. In such an arrangement, whenever P is executed it determines whether a message has arrived which specifies P as the shared secret and, if so, proceeds to develop a decryption key and decrypts the encrypted portion of the message to obtain dataset Q.

Lastly, computer B installs the information gained from computer A, and it that information is part of the executed program P, then computer B installs Q over P's image in the hard disk, overlays itself with the new image, and restarts the modified version of P; to wit, the program Q.

The disclosed method can be put to advantageous use in many applications.

In connection with commercial entities that have interconnected computers, the disclosed method can be used to maintain synchronism between data stored in more than one computer. In a bank, for example, existing accounts can be reconciled, new accounts can be created, programs can be updated, and new programs can be installed.

In a telecommunication network, for example, the disclosed method can be used to maintain synchronism between programs that the different switches use, maintain/modify routing tables to take account of slow changes in traffic patterns and also to take emergency rerouting actions, when necessary, etc. In a telecommunication network such as disclosed in a co-pending application Ser. No. 08/627,659 filed for A. G. Fraser, on Apr. 4, 1996, and titled "Packet Telephone System", the disclosed method can be used to provision the intelligent terminals at the extremities of the network.

In a consumer computing environment, the disclosed method can be used by a provider of software to inexpensively update its customers with new/improved/corrected software. Through a modern connection, a personal computer can establish a connection with the software provider (initiated by the personal computer or, if the personal computer is properly conditioned, preferably by the software provider) and thereby accepts updates. In this manner, the updates need not be complete substitutions.

As an aside, whereas the above disclosure speaks in terms of datasets stored in computers, it should be understood that what is meant is that datasets are stored in some storage means associated, at least during the secure communication, with some processing means.

It should be also understood that although the above discloses the principles of the invention and a number of embodiments, different embodiments are also possible that are encompassed by the spirit and scope of the accompanying claims. For example, although computers A and B can begin their long term communication relationship with a file that is known to both and that is used by at least one of them for a purpose other than key generation, with time, they may abandon this other use of the file. At such time, computers A and B would maintain the file's shared secret aspect and key generation purpose, and either computer might modify the shared secret file in whatever manner is desired and update the other computer. Actually, there is no specific requirement that computers A and B must start with a dataset that is also used for a purpose other than as a shared secret. Computers A and B can start with a dataset that is related solely to a secret key and then modify it in whatever arbitrary manner computers A and B desire, by sending each other modifications, and perhaps applying a one-way function to the modifications, to obtain thereby a new shared secret dataset.

I claim:

1. A method executed in computer A for communicating a first dataset from computer A to computer B, comprising the steps of:

generating an encryption key based on a shared secret dataset that is also used by computer B for generating an encryption key, where said shared secret dataset is employed in either computer A or in computer B also for a purpose other than generating an encryption key;

encrypting said first dataset with the generated encryption key generated to form thereby an encrypted message; and transmitting said encrypted message to computer B together with an indication identifying said shared secret dataset.

2. The method of claim 1 where, in the step of transmitting, computer A also transmits an indication identifying the shared secret dataset.

3. The method of claim 1 where the first dataset corresponds to a modified version of the shared secret dataset or corresponds to a difference between the modified version of the shared secret dataset and the shared secret dataset in computer B.

4. The method of claim 3 where the shared secret dataset is a program.

5. The method of claim 1 where the first dataset includes a second dataset and a third dataset which corresponds to a modified version of the shared secret dataset or to a difference between the modified version of the shared secret dataset and the shared secret dataset in computer B.

6. The method of claim 1 where the shared secret dataset is V and encryption key is generated is based on V.

7. The method of claim 1 where the shared secret dataset is V and the encryption key is $\sigma(V)$, where $\sigma$ is a one-way function.

8. The method of claim 7 where the one-way function is a checksum function.

9. The method of claim 8 where the first dataset is W, which is different from dataset V.

10. The method of claim 9 where W is an updated version of V.

11. The method of claim 7 where the first dataset is $[W,\sigma(W)]$, $[\Delta(W,V),\sigma(W)]$, $[W,\sigma(\Delta(W,V))]$, or $[\Delta(W,V),\sigma(\Delta(W,V))]$, where $\Delta(W,V)$ is a function that computes the difference between datasets W and V, and where the step of transmitting transmits $i(V),E_{\sigma(V)}\{W,\sigma(W)\}$, $i(V),E_{\sigma(V)}\{\Delta(W,V),\sigma(W)\}$, $i(V),E_{\sigma(V)}\{W,\sigma(\Delta(W,V))\}$, or $i(V),E_{\sigma(V)}\{\Delta(W,V),\sigma(\Delta(W,V))\}$, respectively, where $E_{\sigma(P)}\{M\}$ is an encryption of dataset M with key $\sigma(P)$, where P is a shared secret dataset, and where $i(V)$ is information that references dataset V.

12. The method of claim 11 where dataset W includes dataset V.

13. The method of claim 1 where the shared secret dataset is V, the encryption key is $\sigma(V)$, where $\sigma$ is a one-way function, and the first dataset is $\Delta(W,V)$, where $\Delta(W,V)$ is a function that computes the difference between datasets W and V.

14. The method of claim 13 where $\Delta(W,V)$ also compresses the computed difference.

15. The method of claim 1 where the step of computer A encrypting said first dataset also encrypts an encryption key based on the first dataset.

16. The method of claim 1 where the step of computer A encrypting said first dataset encrypts the first dataset concatenated with an encryption key based on the first dataset.

17. A method carried out in computer A for communicating from computer A to computer B, comprising the steps of:

generating an encryption key based on a shared secret dataset that is also used by computer B for generating an encryption key;

modifying the shared secret dataset in a manner that is unrelated to its functionality as the shared secret dataset;

forming a combined dataset that includes modifications to the shared secret dataset created in the step of modifying;

computer A encrypting said combined dataset with the generated encryption key to form an encrypted message; and computer A transmitting said encrypted message to computer B together with an indication identifying said shared secret dataset.

18. The method of claim 17 where the shared secret dataset is a program with a functionality that is unrelated to its function as a shared secret dataset.

19. The method of claim 17 where the combined dataset is the shared secret dataset or merely the changes in the shared secret dataset.

20. The method of claim 17 where the combined dataset comprises a dataset in addition to either the shared secret dataset or the changes in the shared secret dataset.

21. A method executed in a computer B for communicating a first dataset from computer A to computer B, comprising the steps of:

receiving an incoming dataset via a transmission from computer A;

from said incoming dataset, identifying
 a) a dataset that serves as a shared secret, and
 b) an encrypted portion of said incoming dataset;

developing a decryption key based on the shared secret;

decrypting the encrypted portion with the decryption key; and installing a dataset in accordance with information developed in the previous steps.

22. The method of claim 21 where the information employed in the step of installing comprises information that identifies the dataset that is installed, and is obtained from information that in included in the encrypted portion.

23. The method of claim 22 where the step of installing comprises updating a file that is present in computer B.

24. The method of claim 21 where the information employed in the step of installing comprises information that identifies a dataset in computer B that is to be updated.

25. The method of claim 21 where the information is derived from either the shared secret dataset or from information that is included in the encrypted portion.

26. A method executed in a computer when a program X whose primary function is unrelated to encryption is executed, comprising the steps of:

1) determining whether a preselected storage area of the computer contains a received dataset;

2) from said received dataset, identifying
 a) a plaintext portion that includes information about a dataset in said computer that serves as a shared secret, and
 b) an encrypted portion of said incoming dataset;

3) developing a decryption key based on the shared secret;

4) decrypting the encrypted portion with the decryption key; and 5) installing a dataset in accordance with information developed the previous steps.

27. The method of claim 26 where the step of determining also determines whether the received dataset points to program X and steps 2–5 are carried out only when the received dataset points to program X.

28. The method of claim 27 where the pointing information is contained in the plaintext of the received dataset.

29. The method of claim 28 where the pointing information informs program X that program X is the shared secret, or that program X is to be updated with information derived from the encrypted portion, or both.

30. The method of claim 26 where the step of decryption develops a dataset W and a first value, and where the step of installing includes steps to determine whether to proceed with installing, which steps comprise developing a second value by applying a checksum function $\sigma$ to W, comparing the first value to the second value, and proceeding with the step of installing when the first value matches the second value.

* * * * *